No. 659,652. Patented Oct. 16, 1900.
J. R. DE REMER.
IMPACT WATER WHEEL.
(Application filed Apr. 24, 1899.)
(No Model.) 2 Sheets—Sheet 1.

No. 659,652. Patented Oct. 16, 1900.
J. R. DE REMER.
IMPACT WATER WHEEL.
(Application filed Apr. 24, 1899.)
(No Model.) 2 Sheets—Sheet 2.
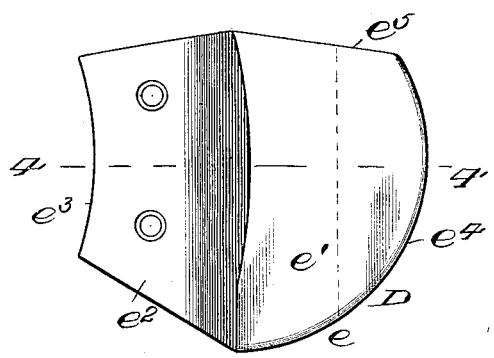
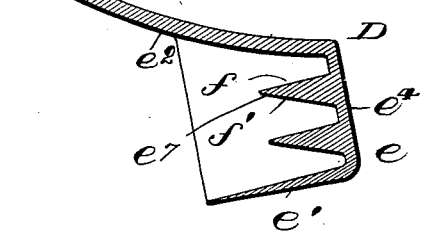
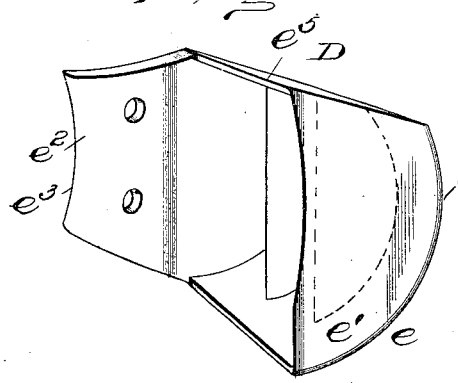
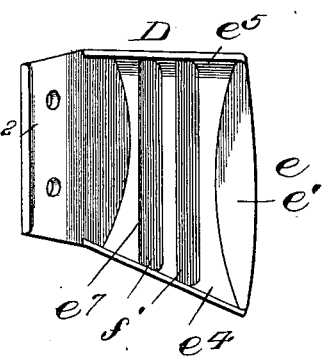
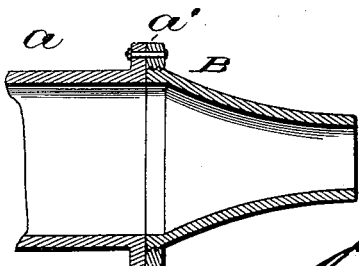

UNITED STATES PATENT OFFICE.

JARED R. DE REMER, OF GLENWOOD SPRINGS, COLORADO, ASSIGNOR OF ONE-THIRD TO H. D. CRIPPEN, OF DENVER, COLORADO.

IMPACT WATER-WHEEL.

SPECIFICATION forming part of Letters Patent No. 659,652, dated October 16, 1900.

Application filed April 24, 1899. Serial No. 714,218. (No model.)

*To all whom it may concern:*

Be it known that I, JARED R. DE REMER, of Glenwood Springs, in the county of Garfield and State of Colorado, have invented certain new and useful Improvements in Impact Water-Wheels; and I do hereby declare the following to be a full, clear, and exact description of the invention, such as will enable others skilled in the art to which it appertains to make and use the same.

This invention contemplates certain new and useful improvements in water turbines.

The primary object of the invention is to operate a turbine wheel by a plurality of jets of water directed against buckets mounted on the wheel's periphery.

A further object is to provide a bucket so constructed as to prevent backlash of water having any retarding action on the wheel.

A further object is to so form the buckets that the water will impinge toward the periphery of the wheel and the maximum power will be communicated to the latter.

The invention will be hereinafter fully set forth, and particularly pointed out in the claims.

Figure 1:
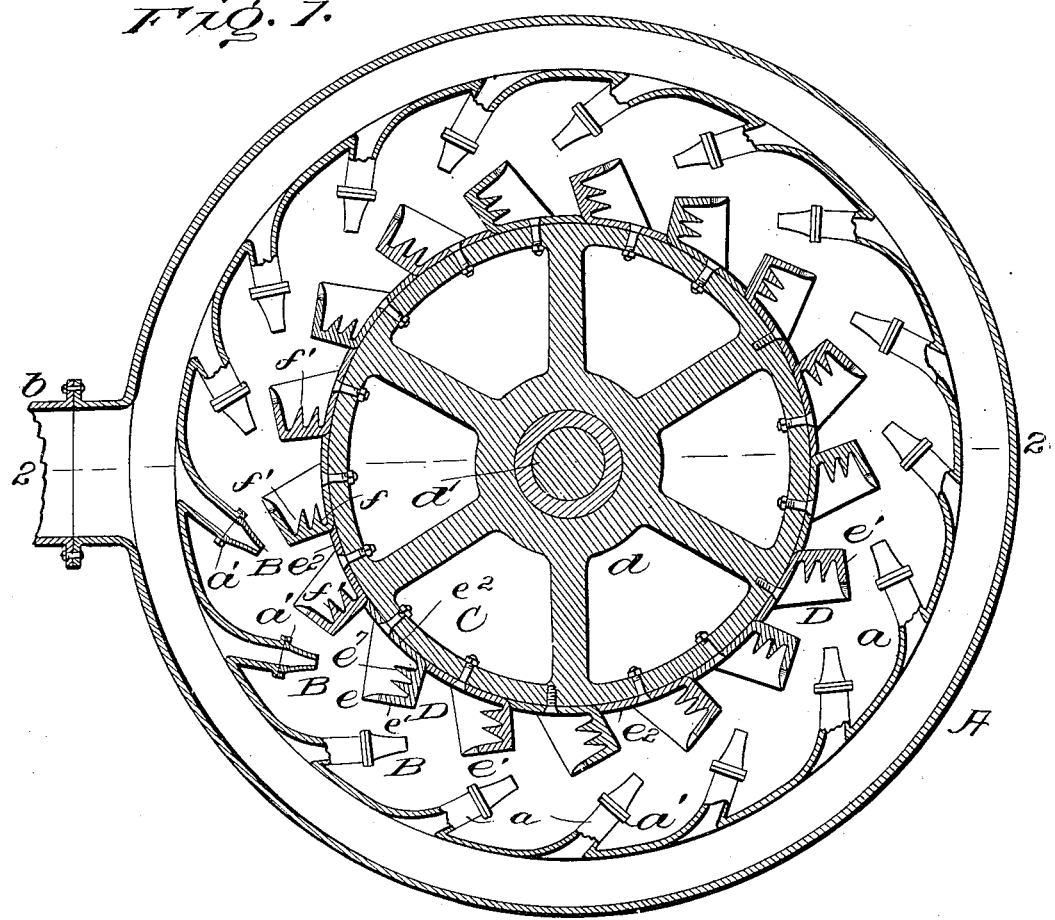
Figure 2:
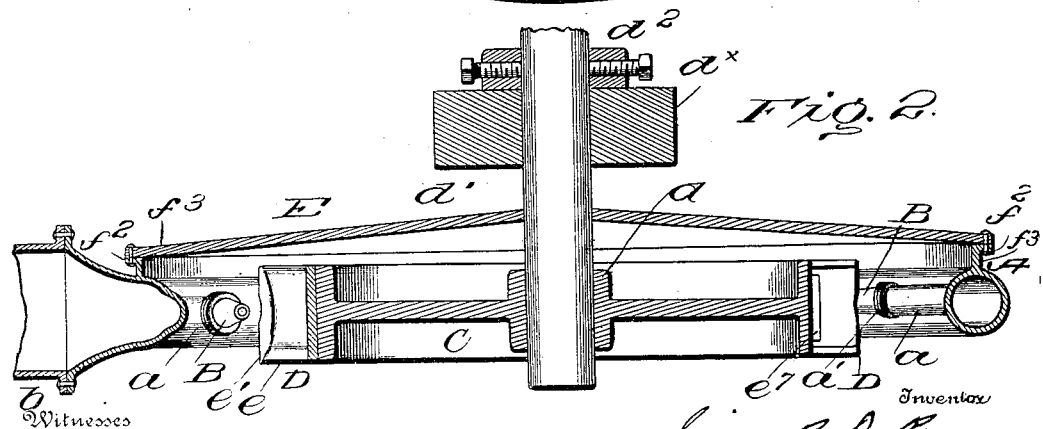

In the accompanying drawings, Figure 1 is a horizontal sectional view with the cover removed. Fig. 2 is a vertical cross-sectional view on line 2 2, Fig. 1, the cover being in position. Fig. 3 is a face view of one of the buckets. Fig. 4 is a sectional view on line 4 4, Fig. 3. Fig. 5 is a perspective view of one of the buckets. Fig. 6 is a view of the bucket at its open end. Fig. 7 shows one of the nozzles and the ring with which it engages.

Referring to the drawings, A designates a circular casing of cylindrical formation in cross-section—that is, the casing is approximately in tubular or pipe-like form. It is provided with spaced-apart branches $a$, which project inwardly on tangential lines. On the flanged ends of these branches are secured rings $a'$, having internally-threaded openings which receive the exteriorly-threaded portions of nozzles B. These nozzles are formed with central bores, which are contracted at their outlet ends. These several nozzles are directed inwardly from the cylindrical casing at an acute angle. Into casing A opens a feed-pipe $b$, by which water is supplied to the casing.

C is a wheel of considerably less diameter than the circular casing A, within which it is concentrically located. The hub $d$ is fast on a perpendicular shaft $d'$, which is extended through a stationary bearing $d^\times$ above and on which rests a collar $d^2$, keyed on the shaft. By means of this collar the position of the wheel may be adjusted—that is, raised and lowered.

On the periphery of the wheel is a continuous series of buckets D. Each bucket is composed of a body $e$, having an outer flat wall $e'$ and an inner wall $e^2$. The latter is of greater length than the former, is curved throughout its length, and has at its outer end a curved recess $e^3$. The sides $e'$ and $e^2$ are connected by a concavo-convex wall $e^4$ and a top $e^5$ and are divergently arranged in relation to each other from their points of union with said connecting-wall $e^4$. The top $e^5$ is flat and slightly tapered to the point of meeting with the upper end of the curved wall $e^4$. The latter extends from such point to the lower forward end of the wall $e'$. Within the body of the bucket and running in the direction of the walls $e'$ and $e^2$ are ribs $e^7$, formed with said connecting-wall $e^4$. The inner side $f$ of each of these ribs is substantially parallel with the outer wall $e'$ of the bucket, while the outer side $f'$ of each of said ribs is substantially parallel with the contiguous portion of the inner wall $e^2$ of the bucket. This formation is observed in order that the full striking force of the water will be exerted against the buckets, impinging outwardly toward the periphery of the wheel, and hence communicating the maximum power to the latter. The flattening of the top of the bucket is to prevent backlash of water on the buckets impeding the rotation of the wheel, the water being discharged downward. The several buckets are fastened to the wheel by screws or bolts inserted through holes in the inner walls $e^2$. The curved side of the wall $e^4$ of each bucket fits within the recess $e^3$ of the inner wall of the next adjacent bucket. In this way the several buckets serve to hold or brace one another on the wheel-rim. The buckets may of course be cast with the wheel.

E is the cover, which is bolted near its periphery to ears $f^2$, formed on a continuous flange $f^3$ on the top of the casing A.

In practice water admitted through the inlet-pipe will pass into the tubular casing, from which it will be ejected in jets against the buckets, which are on the same horizontal plane as and come in line with the several spaced-apart nozzles. The several jets of water are directed against the open faces of the buckets, and upon striking within the latter the full force of each stream of water will be communicated to the wheel. The formation of the ribs and that of the body of the bucket insures the full striking force of the water being communicated to the wheel, the beveled sides of the ribs causing the water to impinge against the outside of the bucket, aiding the centrifugal force created by the rotation of the wheel. Backlash of the water is avoided by the flattening of the top of the bucket. The water falling from the bucket may be conveyed away through a tail-race. (Not shown.)

The advantages of my invention are apparent. It will be seen that a turbine wheel constructed as described is provided with open-faced buckets, that the water is applied thereto in jets, and the full striking force of the water is communicated to the rotary wheel. The operation of the wheel is continuous and the power derived is the maximum.

A water turbine made in accordance with my invention works without direct pressure of the water—that is, the wheel is not bodily submerged nor is any part of it.

I claim as my invention—

1. The combination with a wheel, of a series of buckets mounted on the periphery thereof, having each an open end, said buckets being composed of inner and outer walls and a connecting-wall, said inner and outer walls being divergently arranged in relation to each other from their union to said connecting-wall, and ribs in said buckets, the inner sides of said ribs being substantially parallel with the outer wall of the bucket, while the outer sides of said ribs are substantially parallel with the inner wall thereof, substantially as set forth.

2. The combination with a wheel, of a series of buckets mounted on the periphery thereof, having each an open end, said buckets being composed of inner and outer walls and a curved connecting-wall, said inner and outer walls being divergently arranged in relation to each other from their union to the curved portion of said connecting-wall, said latter wall being flattened at the tops of said inner and outer walls, ribs formed with the curved portion of said connecting-wall, the inner sides of said ribs being substantially parallel with the outer wall, while the outer sides of said ribs are substantially parallel with the inner wall of the bucket, substantially as set forth.

In testimony whereof I have signed this specification in the presence of two subscribing witnesses.

JARED R. DE REMER.

Witnesses:
CHAS. A. LEE,
H. H. HARRIS.